(12) United States Patent
Lee

(10) Patent No.: US 11,159,812 B2
(45) Date of Patent: Oct. 26, 2021

(54) METHOD AND APPARATUS FOR PROCESSING VIDEO SIGNAL

(71) Applicant: KT CORPORATION, Gyeonggi-do (KR)

(72) Inventor: Bae Keun Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/328,832

(22) PCT Filed: Aug. 31, 2017

(86) PCT No.: PCT/KR2017/009524
§ 371 (c)(1),
(2) Date: Feb. 27, 2019

(87) PCT Pub. No.: WO2018/044087
PCT Pub. Date: Mar. 8, 2018

(65) Prior Publication Data
US 2019/0215524 A1    Jul. 11, 2019

(30) Foreign Application Priority Data

Aug. 31, 2016  (KR) ........................ 10-2016-0112005
Aug. 31, 2016  (KR) ........................ 10-2016-0112006
Aug. 31, 2016  (KR) ........................ 10-2016-0112126

(51) Int. Cl.
*H04N 19/46*   (2014.01)
*H04N 19/132*  (2014.01)
(Continued)

(52) U.S. Cl.
CPC ........... *H04N 19/46* (2014.11); *H04N 19/103* (2014.11); *H04N 19/119* (2014.11);
(Continued)

(58) Field of Classification Search
CPC ...... H04N 19/18; H04N 19/46; H04N 19/176; H04N 19/119
See application file for complete search history.

(56) References Cited

U.S. PATENT DOCUMENTS

2012/0140813 A1  6/2012 Sole Rojals et al.
2012/0140814 A1  6/2012 Sole Rojals et al.
(Continued)

FOREIGN PATENT DOCUMENTS

EP      2727352 A1        5/2014
KR  10-2015-0014414 A     2/2015
(Continued)

OTHER PUBLICATIONS

Joel Sole et al., "Transform Coefficient Coding in HEVC", IEEE Transactions on Circuits and Systems for Video Technology, vol. 22, No. 12, Dec. 2012, pp. 1765-1777.
(Continued)

*Primary Examiner* — Tsion B Owens
(74) *Attorney, Agent, or Firm* — IP Legal Services, LLC

(57) ABSTRACT

A method for decoding a video according to the present invention may comprise: decoding information indicating whether a non-zero transform coefficient exists in a current block, when the information indicates that the non-zero transform coefficient exists in the current block, determining a scanning order of the current block, and decoding a transform coefficient included in the current block according to the determined scanning order.

4 Claims, 9 Drawing Sheets

(51) Int. Cl.

| | |
|---|---|
| *H04N 19/176* | (2014.01) |
| *H04N 19/119* | (2014.01) |
| *H04N 19/30* | (2014.01) |
| *H04N 19/44* | (2014.01) |
| *H04N 19/187* | (2014.01) |
| *H04N 19/96* | (2014.01) |
| *H04N 19/169* | (2014.01) |
| *H04N 19/103* | (2014.01) |
| *H04N 19/174* | (2014.01) |
| *H04N 19/147* | (2014.01) |
| *H04N 19/18* | (2014.01) |

(52) U.S. Cl.
CPC ......... *H04N 19/132* (2014.11); *H04N 19/147* (2014.11); *H04N 19/169* (2014.11); *H04N 19/174* (2014.11); *H04N 19/176* (2014.11); *H04N 19/18* (2014.11); *H04N 19/187* (2014.11); *H04N 19/30* (2014.11); *H04N 19/44* (2014.11); *H04N 19/96* (2014.11)

(56) References Cited

U.S. PATENT DOCUMENTS

| | | |
|---|---|---|
| 2012/0163455 A1 | 6/2012 | Zheng et al. |
| 2012/0163456 A1 | 6/2012 | Coban et al. |
| 2012/0163472 A1 | 6/2012 | Sole Rojals et al. |
| 2012/0207211 A1 | 8/2012 | Song et al. |
| 2012/0269274 A1 | 10/2012 | Kim et al. |
| 2013/0003821 A1 | 1/2013 | Karczewicz et al. |
| 2013/0003837 A1 | 1/2013 | Yu et al. |
| 2013/0003857 A1 | 1/2013 | Yu et al. |
| 2013/0022115 A1 | 1/2013 | Oh |
| 2013/0039415 A1 | 2/2013 | Kim et al. |
| 2013/0136179 A1 | 5/2013 | Lim et al. |
| 2013/0182758 A1* | 7/2013 | Seregin ................ H04N 19/119 375/240.02 |
| 2013/0272379 A1* | 10/2013 | Sole Rojals ......... H04N 19/176 375/240.02 |
| 2013/0315299 A1 | 11/2013 | Kim et al. |
| 2013/0329807 A1 | 12/2013 | Lim et al. |
| 2014/0219339 A1 | 8/2014 | Park |
| 2014/0219343 A1 | 8/2014 | Park |
| 2014/0341274 A1 | 11/2014 | Sole Rojals et al. |
| 2015/0195543 A1 | 7/2015 | Kim et al. |
| 2015/0222893 A1 | 8/2015 | Oh et al. |
| 2015/0222894 A1 | 8/2015 | Oh et al. |
| 2015/0222895 A1 | 8/2015 | Oh et al. |
| 2015/0222896 A1 | 8/2015 | Oh et al. |
| 2015/0222898 A1 | 8/2015 | Oh et al. |
| 2015/0222899 A1 | 8/2015 | Oh et al. |
| 2015/0222901 A1 | 8/2015 | Oh et al. |
| 2015/0222902 A1 | 8/2015 | Oh et al. |
| 2015/0222907 A1 | 8/2015 | Oh et al. |
| 2015/0222908 A1 | 8/2015 | Oh et al. |
| 2015/0288960 A1 | 10/2015 | Kim et al. |
| 2015/0288961 A1 | 10/2015 | Kim et al. |
| 2015/0288971 A1 | 10/2015 | Lim et al. |
| 2015/0288972 A1 | 10/2015 | Lim et al. |
| 2015/0288987 A1 | 10/2015 | Lim et al. |
| 2015/0334401 A1 | 11/2015 | Song et al. |
| 2015/0334402 A1 | 11/2015 | Song et al. |
| 2015/0341637 A1 | 11/2015 | Kim et al. |
| 2016/0173879 A1 | 6/2016 | Park |
| 2016/0173880 A1 | 6/2016 | Park |
| 2016/0182908 A1 | 6/2016 | Park |
| 2016/0182909 A1 | 6/2016 | Park |
| 2017/0188050 A1* | 6/2017 | Kim ..................... H04N 19/61 |
| 2018/0288410 A1* | 10/2018 | Park .................... H04N 19/105 |
| 2019/0306536 A1* | 10/2019 | Lim .................... H04N 19/649 |

FOREIGN PATENT DOCUMENTS

| | | |
|---|---|---|
| WO | 2011/133002 A2 | 10/2011 |
| WO | 2012/118358 A2 | 9/2012 |
| WO | 2013/062194 A1 | 5/2013 |

OTHER PUBLICATIONS

European Patent Office, Extended European Search Report of corresponding EP Patent Application No. 17847012.6, dated Mar. 25, 2020.

Vivienne Sze et al., "High Efficiency Video Coding (HEVC)", Algorithms and Architectures, Springer International Publishing, Switzerland, 2014.

Jianle Chen et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016.

* cited by examiner

FIG. 9

METHOD AND APPARATUS FOR PROCESSING VIDEO SIGNAL

CROSS REFERENCE TO RELATED APPLICATIONS

This application is a National Stage Patent Application of PCT International Patent Application No. PCT/KR2017/009524 (filed on Aug. 31, 2017) under 35 U.S.C. § 371, which claims priority to Korean Patent Application Nos. 10-2016-0112005 (filed on Aug. 31, 2016), 10-2016-0112006 (filed on Aug. 31, 2016), and 10-2016-0112126 (filed on Aug. 31, 2016), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is to provide a method and an apparatus for efficiently encoding/decoding a transform coefficient an encoding/decoding target block in encoding/decoding a video signal.

An object of the present invention is to provide a method and an apparatus for encoding/decoding transform coefficient coded indicator hierarchically in encoding/decoding a video signal.

An object of the present invention is to provide a method and an apparatus for adaptively determining a scan order or a base unit to which scanning is performed in encoding/decoding a video signal.

The technical objects to be achieved by the present invention are not limited to the above-mentioned technical problems. And, other technical problems that are not mentioned will be apparently understood to those skilled in the art from the following description.

Technical Solution

A method and an apparatus for decoding a video signal according to the present invention may decode information indicating whether a non-zero transform coefficient exists in a current block, determine a scanning order of the current block when the information indicates that the non-zero transform coefficient exists in the current block, and decode a transform coefficient included in the current block according to the determined scanning order.

A method and an apparatus for encoding a video signal according to the present invention may encode information indicating whether a non-zero transform coefficient exists in a current block according to whether the non-zero transform coefficient exists in the current block, determine a scanning order of the current block when the non-zero transform coefficient exists in the current block, and arrange a transform coefficient included in the current block according to the determined scanning order.

In the method and the apparatus for encoding/decoding a video signal according to the present invention, the information may be encoded/decoded in a unit of a sub-block within the current block.

In the method and the apparatus for encoding/decoding a video signal according to the present invention, a size or a shape of the sub-block may be determined adaptively according to a size or a shape of the current block.

In the method and the apparatus for encoding/decoding a video signal according to the present invention, the information may be encoded/decoded in a pre-determined unit, and the pre-determined unit may be determined based on a number of samples.

In the method and the apparatus for encoding/decoding a video signal according to the present invention, if the current block comprises more samples than the number of samples corresponding to the pre-determined unit, the current block may be divided into a plurality of regions according to the pre-determined unit, and the information may be signaled for each of the plurality of regions.

In the method and the apparatus for encoding/decoding a video signal according to the present invention, one of a plurality of scanning order candidates may be determined as the scanning order of the current block, and a type or a number of the plurality of scanning order candidates may be different according to a size or a shape of the current block.

In the method and the apparatus for encoding/decoding a video signal according to the present invention, the scanning order of the current block may be determined to be same as a scanning order of an upper block including the current block, and a plurality of blocks included in the upper block may have a same scanning order.

The features briefly summarized above for the present invention are only illustrative aspects of the detailed description of the invention that follows, but do not limit the scope of the invention.

Advantageous Effects

According to the present invention, a transform coefficient for an encoding/decoding target block can be encoded/decoded efficiently.

According to the present invention, a transform coefficient coded indicator can be hierarchically encoded/decoded.

According to the present invention, a scan order or a base unit to which scanning is performed can be adaptively determined.

The effects obtainable by the present invention are not limited to the above-mentioned effects, and other effects not mentioned can be clearly understood by those skilled in the art from the description below.

DESCRIPTION OF DRAWINGS

FIG. 9 is a diagram illustrating a transform coefficient level map.

MODE FOR INVENTION

Figure 1:
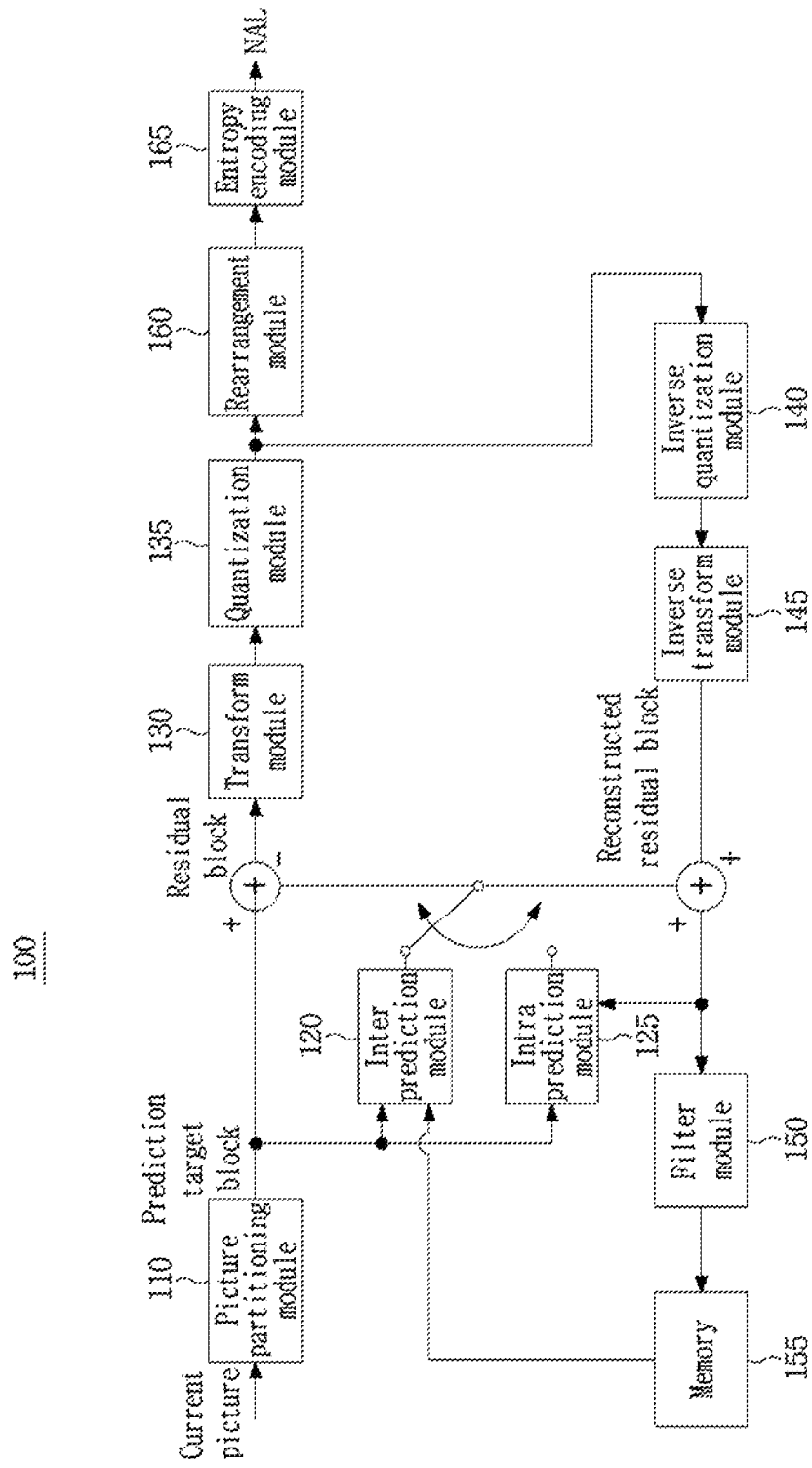
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in a unit of a ¼ pixel. In the case of chroma signals, a 4-tap DCT-based interpolation filter having different filter coefficient may be used to generate pixel information of an integer pixel or less than an integer pixel in a unit of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in a unit of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in a unit of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
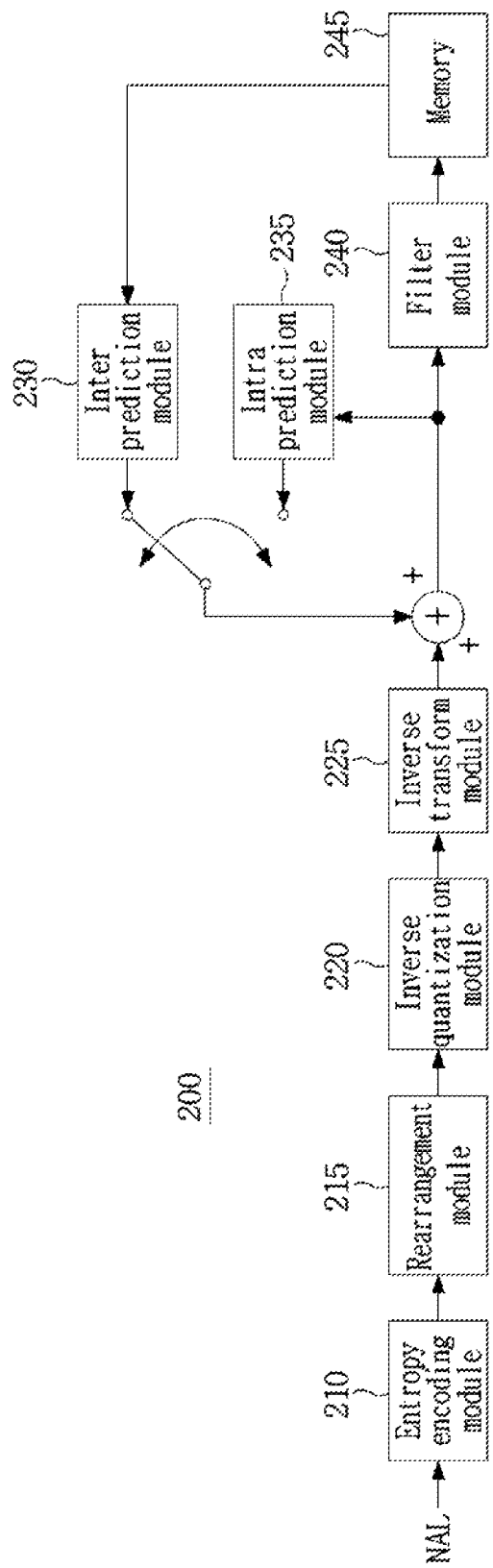
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step.

A picture may be encoded/decoded by divided into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit or a prediction unit, which is a base unit for performing prediction, quantization, transform or in-loop filtering and the like.

Partitioning of a coding tree unit or a coding unit may be performed based on at least one of a vertical line and a horizontal line. In addition, the number of vertical lines or horizontal lines partitioning the coding tree unit or the coding unit may be at least one or more. For example, the coding tree unit or the coding unit may be divided into two partitions using one vertical line or one horizontal line, or the coding tree unit or the coding unit may be divided into three partitions using two vertical lines or two horizontal lines. Alternatively, the coding tree unit or the coding unit may be partitioned into four partitions having a length and a width of ½ by using one vertical line and one horizontal line.

When a coding tree unit or a coding unit is divided into a plurality of partitions using at least one vertical line or at least one horizontal line, the partitions may have a uniform size or a different size. Alternatively, any one partition may have a different size from the remaining partitions.

In the embodiments described below, it is assumed that a coding tree unit or a coding unit is divided into a quad tree structure or a binary tree structure. However, it is also possible to divide a coding tree unit or a coding unit using a larger number of vertical lines or a larger number of horizontal lines.

Figure 3:
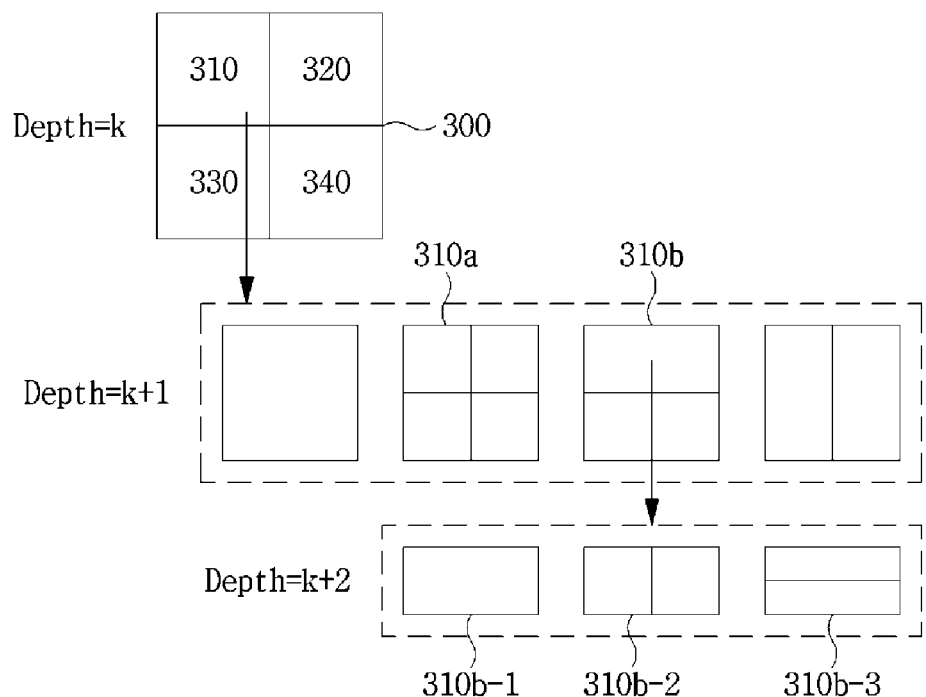
FIG. 3 is a diagram illustrating an example of hierarchically partitioning a coding block based on a tree structure according to an embodiment of the present invention.

FIG. 3 is a diagram illustrating an example of hierarchically partitioning a coding block based on a tree structure according to an embodiment of the present invention.

An input video signal is decoded in predetermined block units. Such a default unit for decoding the input video signal is a coding block. The coding block may be a unit performing intra/inter prediction, transform, and quantization. In addition, a prediction mode (e.g., intra prediction mode or inter prediction mode) is determined in a unit of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree and a binary tree. Here, quad tree-based partitioning may mean that a 2N×2N coding block is partitioned into four N×N coding blocks, and binary tree-based partitioning may mean that one coding block is partitioned into two coding blocks. Even if the binary tree-based partitioning is performed, a square-shaped coding block may exist in the lower depth.

Binary tree-based partitioning may be symmetrically or asymmetrically performed. The coding block partitioned based on the binary tree may be a square block or a non-square block, such as a rectangular shape. For example, a partition type in which the binary tree-based partitioning is allowed may comprise at least one of a symmetric type of 2N×N (horizontal directional non-square coding unit) or N×2N (vertical direction non-square coding unit), asymmetric type of nL×2N, nR×2N, 2N×nU, or 2N×nD.

Binary tree-based partitioning may be limitedly allowed to one of a symmetric or an asymmetric type partition. In this case, constructing the coding tree unit with square blocks may correspond to quad tree CU partitioning, and constructing the coding tree unit with symmetric non-square blocks may correspond to binary tree partitioning. Constructing the coding tree unit with square blocks and symmetric non-square blocks may correspond to quad and binary tree CU partitioning.

Binary tree-based partitioning may be performed on a coding block where quad tree-based partitioning is no longer performed. Quad tree-based partitioning may no longer be performed on the coding block partitioned based on the binary tree.

Furthermore, partitioning of a lower depth may be determined depending on a partition type of an upper depth. For example, if binary tree-based partitioning is allowed in two or more depths, only the same type as the binary tree partitioning of the upper depth may be allowed in the lower depth. For example, if the binary tree-based partitioning in the upper depth is performed with 2N×N type, the binary tree-based partitioning in the lower depth is also performed with 2N×N type. Alternatively, if the binary tree-based partitioning in the upper depth is performed with N×2N type, the binary tree-based partitioning in the lower depth is also performed with N×2N type.

On the contrary, it is also possible to allow, in a lower depth, only a type different from a binary tree partitioning type of an upper depth.

It may be possible to limit only a specific type of binary tree based partitioning to be used for sequence, slice, coding tree unit, or coding unit. As an example, only 2N×N type or N×2N type of binary tree-based partitioning may be allowed for the coding tree unit. An available partition type may be predefined in an encoder or a decoder. Or information on available partition type or on unavailable partition type on may be encoded and then signaled through a bitstream.

Figure 5A:
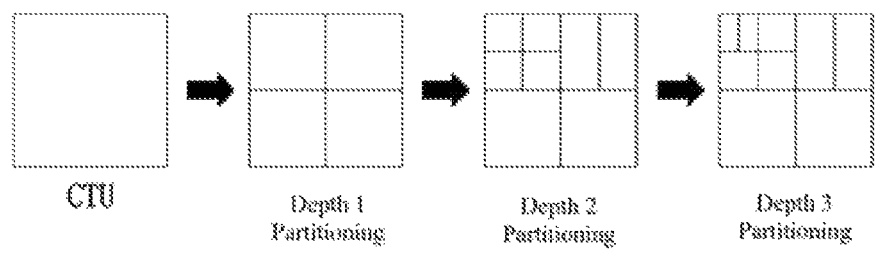
FIGS. 5A and 5B are diagrams illustrating an example in which only a binary tree-based partition of a pre-determined type is allowed according to an embodiment of the present invention.
Figure 5B:
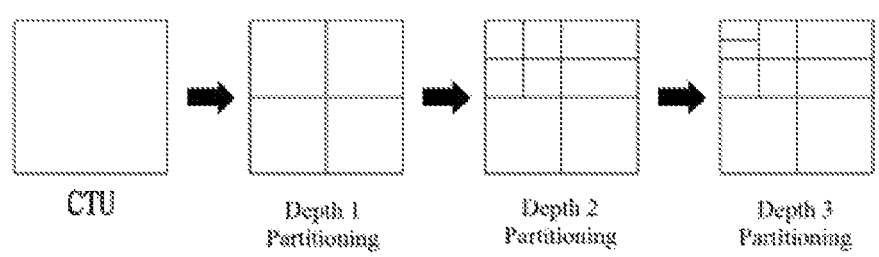

FIGS. 5A and 5B are diagrams illustrating an example in which only a specific type of binary tree-based partitioning is allowed. FIG. 5A shows an example in which only N×2N type of binary tree-based partitioning is allowed, and FIG. 5B shows an example in which only 2N×N type of binary tree-based partitioning is allowed. In order to implement adaptive partitioning based on the quad tree or binary tree, information indicating quad tree-based partitioning, information on the size/depth of the coding block that quad tree-based partitioning is allowed, information indicating binary tree-based partitioning, information on the size/depth of the coding block that binary tree-based partitioning is allowed, information on the size/depth of the coding block that binary tree-based partitioning is not allowed, information on whether binary tree-based partitioning is performed in a vertical direction or a horizontal direction, etc. may be used.

In addition, information on the number of times a binary tree partitioning is allowed, a depth at which the binary tree partitioning is allowed, or the number of the depths at which the binary tree partitioning is allowed may be obtained for a coding tree unit or a specific coding unit. The information may be encoded in a unit of a coding tree unit or a coding unit, and may be transmitted to a decoder through a bitstream.

For example, a syntax 'max_binary_depth_idx_minus1' indicating a maximum depth at which binary tree partitioning is allowed may be encoded/decoded through a bitstream. In this case, max_binary_depth_idx_minus1+1 may indicate the maximum depth at which the binary tree partitioning is allowed.

Figure 6:
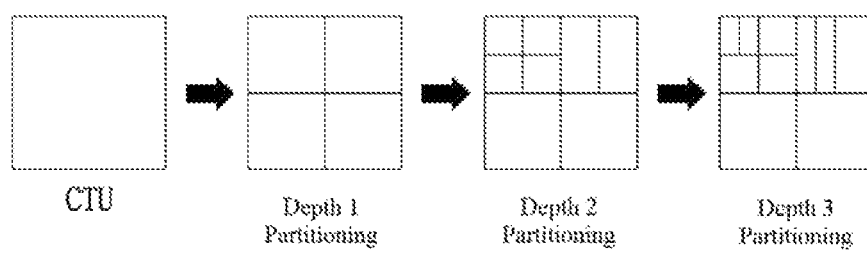
FIG. 6 is a diagram for explaining an example in which information related to the allowable number of binary tree partitioning is encoded/decoded, according to an embodiment to which the present invention is applied.

Referring to the example shown in FIG. 6, in FIG. 6, the binary tree partitioning has been performed for a coding unit having a depth of 2 and a coding unit having a depth of 3. Accordingly, at least one of information indicating the number of times the binary tree partitioning in the coding tree unit has been performed (i.e., 2 times), information indicating the maximum depth which the binary tree partitioning has been allowed in the coding tree unit (i.e., depth 3), or the number of depths in which the binary tree partitioning has been performed in the coding tree unit (i.e., 2 (depth 2 and depth 3)) may be encoded/decoded through a bitstream.

As another example, at least one of information on the number of times the binary tree partitioning is permitted, the depth at which the binary tree partitioning is allowed, or the number of the depths at which the binary tree partitioning is allowed may be obtained for each sequence or each slice. For example, the information may be encoded in a unit of a sequence, a picture, or a slice unit and transmitted through a bitstream. Accordingly, at least one of the number of the binary tree partitioning in a first slice, the maximum depth in which the binary tree partitioning is allowed in the first slice, or the number of depths in which the binary tree partitioning is performed in the first slice may be difference from a second slice. For example, in the first slice, binary tree partitioning may be permitted for only one depth, while in the second slice, binary tree partitioning may be permitted for two depths.

As another example, the number of times the binary tree partitioning is permitted, the depth at which the binary tree partitioning is allowed, or the number of depths at which the binary tree partitioning is allowed may be set differently according to a time level identifier (TemporalID) of a slice or a picture. Here, the temporal level identifier (TemporalID) is used to identify each of a plurality of layers of video having a scalability of at least one of view, spatial, temporal or quality.

As shown in FIG. 3, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, and the information on the size/depth of the coding block that binary tree-based partitioning is not allowed.

A number of a candidate that represent a size of a coding block may be limited to a predetermined number, or a size of a coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree and a binary tree, a coding unit may be represented as square or rectangular shape of an arbitrary size.

A coding block is encoded using at least one of a skip mode, intra prediction, inter prediction, or a skip method. Once a coding block is determined, a prediction block may be determined through predictive partitioning of the coding block. The predictive partitioning of the coding block may be performed by a partition mode (Part mode) indicating a partition type of the coding block. A size or a shape of the prediction block may be determined according to the partition mode of the coding block. For example, a size of a prediction block determined according to the partition mode may be equal to or smaller than a size of a coding block.

Figure 7:
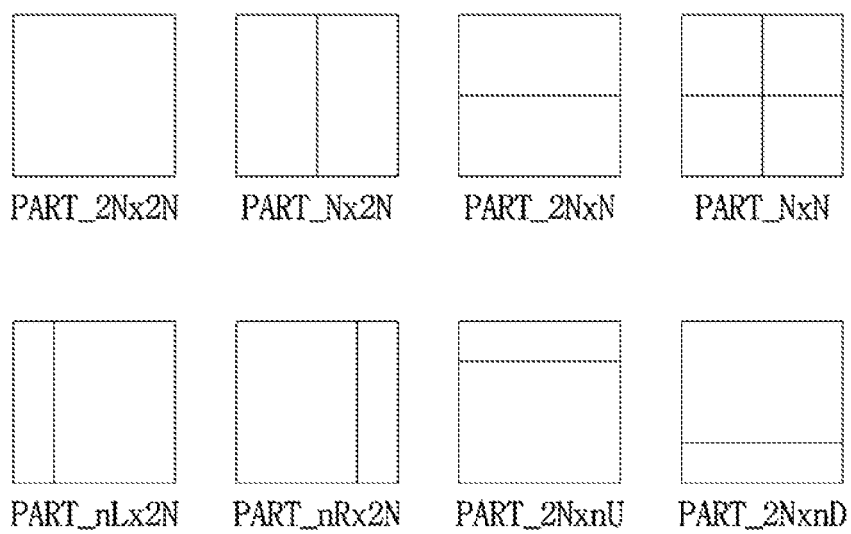
FIG. 7 is a diagram illustrating a partition mode applicable to a coding block according to an embodiment of the present invention.

FIG. 7 is a diagram illustrating a partition mode that may be applied to a coding block when the coding block is encoded by inter prediction.

Figure 4:
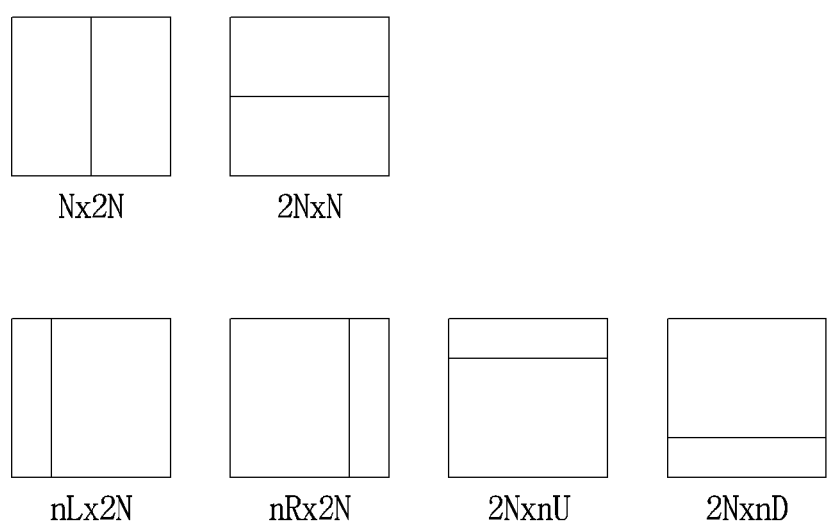
FIG. 4 is a diagram illustrating a partition type in which binary tree-based partitioning is allowed according to an embodiment of the present invention.

When a coding block is encoded by inter prediction, one of 8 partitioning modes may be applied to the coding block, as in the example shown in FIG. 4.

When a coding block is encoded by intra prediction, a partition mode PART_2N×2N or a partition mode PART_N×N may be applied to the coding block.

PART_N×N may be applied when a coding block has a minimum size. Here, the minimum size of the coding block may be pre-defined in an encoder and a decoder. Or, information regarding the minimum size of the coding block may be signaled via a bitstream. For example, the minimum size of the coding block may be signaled through a slice header, so that the minimum size of the coding block may be defined per slice.

In general, a prediction block may have a size from 64×64 to 4×4. However, when a coding block is encoded by inter prediction, it may be restricted that the prediction block does not have a 4×4 size in order to reduce memory bandwidth when performing motion compensation.

The encoder may perform a transform or a quantization on a residual sample (or residual signal) in a unit of a predetermined block, and thereby generate a residual coefficient. Here, the predetermined block unit may mean a unit on which the transform or the quantization is performed. A size of the predetermined block unit may be same for color components or may be different for each color component. For example, a residual coefficient for a luminance component (Luma) and a chrominance component (Cb, Cr) may be generated in a different block unit.

The block unit on which the transform or the quantization is performed may be referred to as a transform block, and the transform block may have a square shape or a non-square shape. For example, the transform block may have a square shape such as 4×4, 8×, 16×16, 32×32 or 64×64, or may have a non-square shape, such as 4×8, 8×4, 8×16, 16×8, 16×32, 32×16, 32×64, 64×32, 4×16, 4×32 or 8×32, etc.

The decoder may decode the residual coefficient from the bitstream received from the encoder and decode the residual sample (or residual signal) by performing at least one of an inverse quantization and an inverse transform on the decoded residual signal. Processes of decoding a residual coefficient and generating residual signal by performing at least one of the inverse quantization and the inverse transform on the decoded residual signal may be defined as 'residual coefficient decoding'.

Hereinafter, processes of the residual coefficient decoding will be described in detail.

Figure 8:
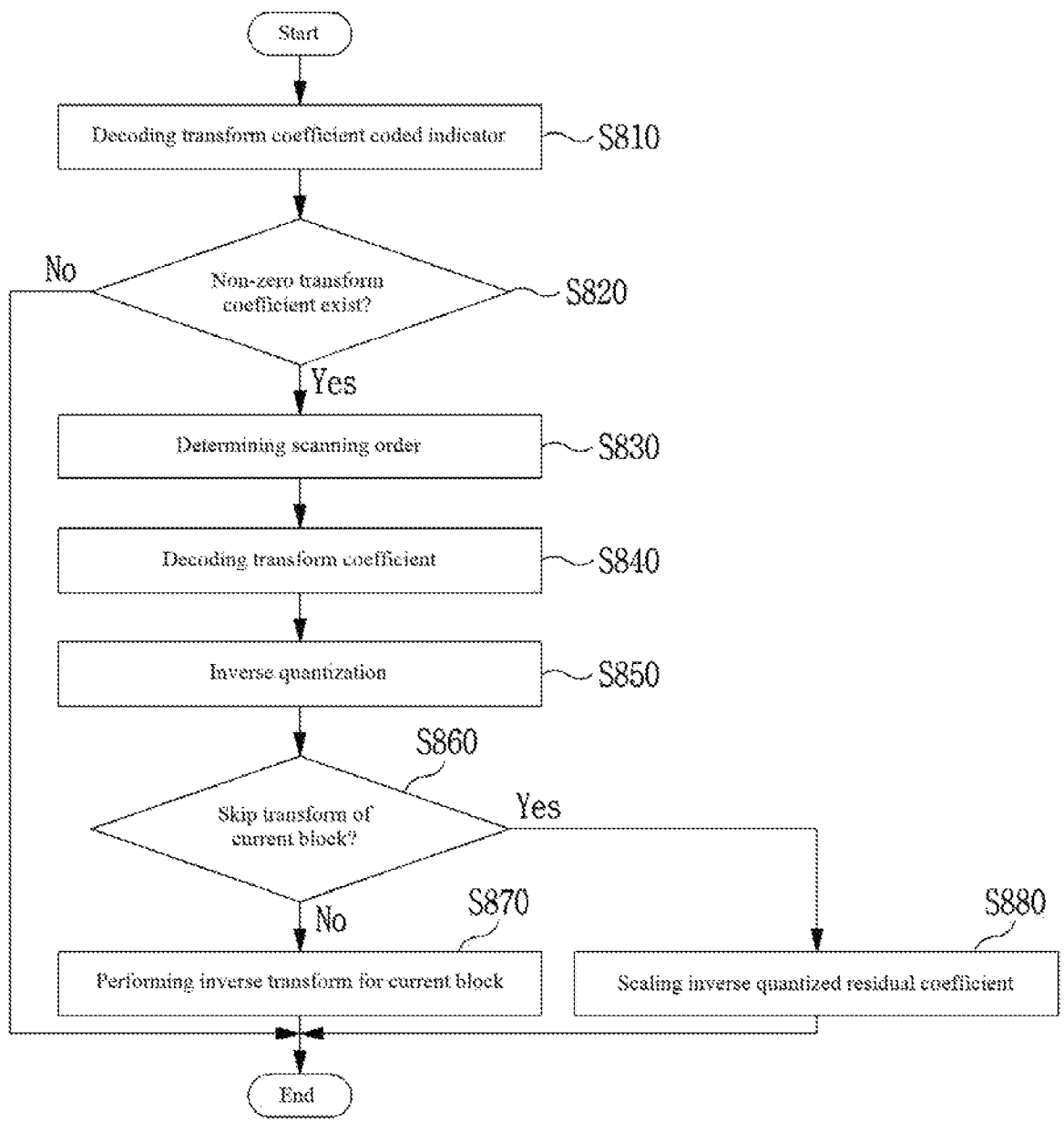
FIG. 8 is a flowchart illustrating processes of obtaining a residual sample according to an embodiment of the present invention.

FIG. 8 is a flowchart illustrating processes of obtaining a residual sample according to an embodiment of the present invention.

The decoder may decode information indicating whether a non-zero transform coefficient exists in a current block from a bitstream S810, and may determine whether to decode the residual coefficient of the current block based on the information S820.

The information may include a transform coefficient coded indicator (coded_block_flag, CBF) indicating whether or not the transform coefficient exists in the current block. The transform coefficient coded indicator may indicate whether a non-zero transform coefficient exists in a block of a predetermined unit. For example, when the transform coefficient coded indicator is 0, it may indicate that there is no non-zero transform coefficient in the block of the predetermined unit, and when the transform coefficient coded indicator is 1, it may indicate that there exists at least one non-zero transform coefficient in the block of the predetermined unit. The transform coefficient coded indicator may be encoded and signaled for each of the luminance component and the chrominance component.

The transform coefficient coded indicator may comprise at least one of indicator (e.g., 'rqt_root_cbf') signaled in a unit of a block (e.g., a transform block, a coding block or a coding tree block) or an indicator (e.g., 'coded_sub_block_flag') signaled in a unit of a sub-block of a predetermined size.

For example, the rqt_root_cbf may indicate whether the current block includes a non-zero transform coefficient. The decoder may determine whether to decode the residual coefficient according to a value of the rqt_root_cbf. For example, when the rqt_root_cbf is 0, decoding the transform coefficient for the current block (e.g., current transform block) may not be performed, and values of residual samples in the current block may all be set to zero. On the other hand, when the rqt_root_cbf is 1, decoding the transform coefficient in the current block may be performed.

The coded_sub_block_flag may indicate whether or not a non-zero transform coefficient is included in the sub-block of the pre-determined size. For example, the coded_sub_block_flag may be encoded and signaled in a unit of a 4×4 sub-block. If the coded_sub_block_flag is 0, it may mean that there is no non-zero transform coefficient in the sub-block of the predetermined size, and if the coded_sub_block_flag is 1, it may mean that at least one non-zero transform coefficient exists in the sub-block of the predetermined size.

The rqt_root_cbf and the coded_sub_block_flag may be hierarchically encoded and signaled. For example, when the rqt_root_cbf is 0, encoding of coded_sub_block_flag may be omitted. On the other hand, when rqt_root_cbf is 1 and a size of the current block is greater than the sub-block, the coded_sub_block_flag may be encoded and signaled in a unit of a sub-block of the predetermined size in the current block.

It is also possible to hierarchically encode and signal transform coefficient coded indicators between a transform block and a coding block. For example, after encoding/decoding a first transform coefficient coded indicator indicating whether there is at least one transform block including a non-zero transform coefficient among a plurality of transform blocks, and then it may be determined based on a value of the first transform coefficient coded flag, whether to encode/decode a second transform coefficient coded flag for each transform block. Here, at least one of a size or a shape of an upper block including the plurality of transform blocks may have a predefined value or may be determined through information to be decoded through the bitstream. Alternatively, at least one of the size or the shape of the upper block may be determined based on a partition type of the coding tree block. For example, a non-square coding block or a square coding block including a plurality of non-square transform blocks may be defined as the upper block for the plurality of the non-square transform blocks. The transform coefficient coded indicator may be hierarchically encoded through two or more layers.

As described above, a method of hierarchically encoding a transform coefficient coded indicator may be referred to as a method of deriving a hierarchical coded block flag (HCBF).

When at least one non-zero transform coefficient is included in the current block, the transform coefficient may be decoded using a transform coefficient level indicator indicating whether the transform coefficient is 0 or not. The transform coefficient level indicator is a 1-bit flag (e.g., 'significant_flag') indicating whether each transform coefficient in the current block is 0 or not. For example, if the significant_flag is 1, it indicates that the transform coefficient is not 0, and if the significant_flag is 0, it indicates that the transform coefficient is 0.

It may be referred to as a transform coefficient level map (Significant Map) that depicts whether each transform coefficient in the current block is 0 or not. The encoder may encode the transform coefficient coded indicator and the transform coefficient level indicator for each transform coefficient according to the transform coefficient level map, and encode an absolute value and a sign of the non-zero transform coefficient. The decoder may decode the transform coefficient level map according to the transform coefficient coded indicator and the transform coefficient level indicator, and decode the absolute value and the sign of the non-zero transform coefficient.

Figure 9:
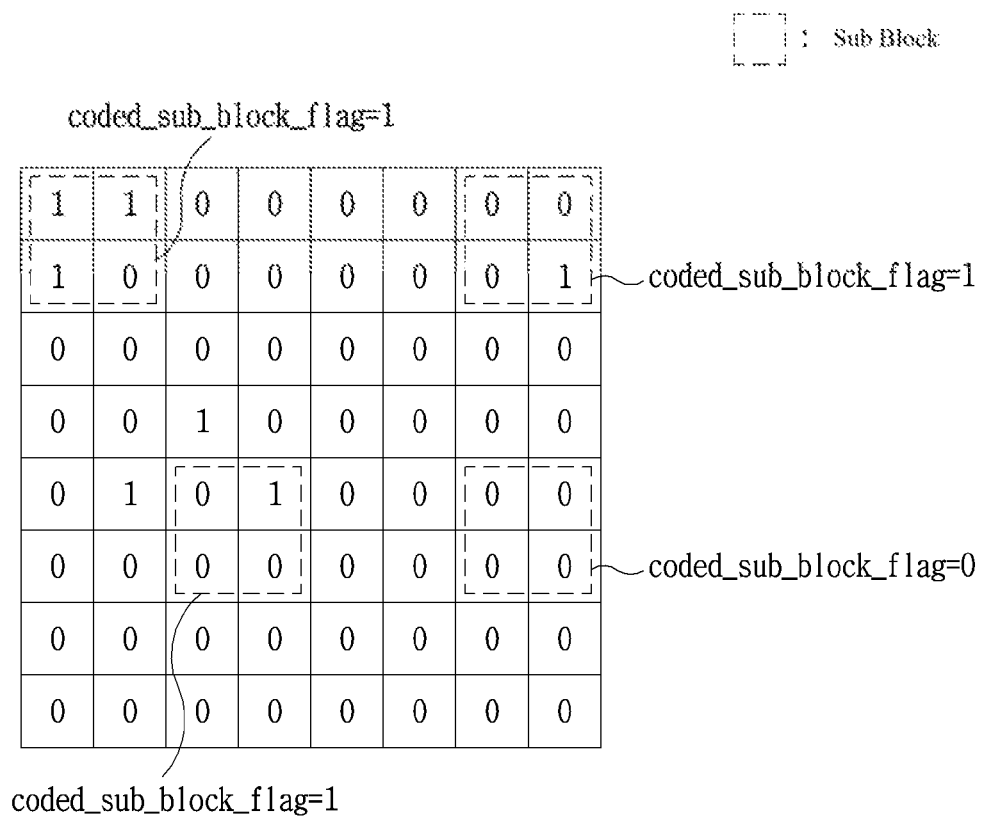

FIG. 9 is a diagram illustrating a transform coefficient level map. Values shown in FIG. 9 indicate values of the transform coefficient level indicator, and coded_sub_block_flag indicates whether or not a non-zero transform coefficient exists for a 4×4 sub-block.

A sub-block of a predetermined size in which information of whether a non-zero transform coefficient exists is encoded/decoded may be referred to as a transform coefficient base block. For example, in FIG. 9, a 4×4 block in which coded_sub_block_flag is encoded may be defined as the transform coefficient base block.

At this time, at least one of a shape or a size of the transform coefficient base block may be differently determined according to at least one of a shape or a size of a coding block or a transform block. For example, if the current block has a square shape, the transform coefficient base block of the current block may also have a square shape, and if the current block has a non-square shape, the transform coefficient base block of the current block may also have a non-square shape. For example, when the current block has a non-square shape of N×2N or N×4N, the transform coefficient base block of the current block may be 2×8, and if the current block has a non-square of 2N×N or 4N×N, the transform coefficient base block of the current block may be 8×2.

As a result of the quadtree partitioning and the binary tree partitioning, a coding tree block or a coding block may include a transform block such as 2×8, 8×2, 4×16 or 16×4. As described above, when the binary tree partitioning is additionally used in addition to the quadtree partitioning, a larger number or more various shapes of transform blocks can be included in the coding tree unit than in the case of using only the quadtree partitioning. Signaling of the transform coefficient coded indicator for every transform block may reduce coding efficiency because as the number of transform blocks increases or the shape thereof is diversified.

Thus, in an embodiment of the present invention, instead of encoding the transform coefficient coded indicator in a unit of a transform block, the transform coefficient coded indicator may be encoded/decoded in a predetermined unit. Or it is also possible to determine whether to encode/decode the transform coefficient coded indicator for the current block by comparing a size of the current block with the predetermined unit. Here, the predetermined unit may be defined by a size of a block, a shape of a block, or the number of samples.

The encoder may encode and signal information (for example, a transform coefficient coded unit indicator) for determining the predetermined unit. The information may indicate the size, the shape, or the number of samples of the block. Further, the information may be encoded and signaled in at least one of a video sequence level, a picture parameter set, a slice header, or a block level.

If the predetermined unit is related to the size of the block or the number of samples, and if the current block is smaller than the predetermined unit, it may be determined whether or not the current block includes a non-zero transform coefficient based on the indicator encoded for the predetermined unit. On the other hand, when the current block is equal to or larger than the predetermined unit, the transform coefficient coded indicator may be encoded and signaled for the current block.

Figure 10:
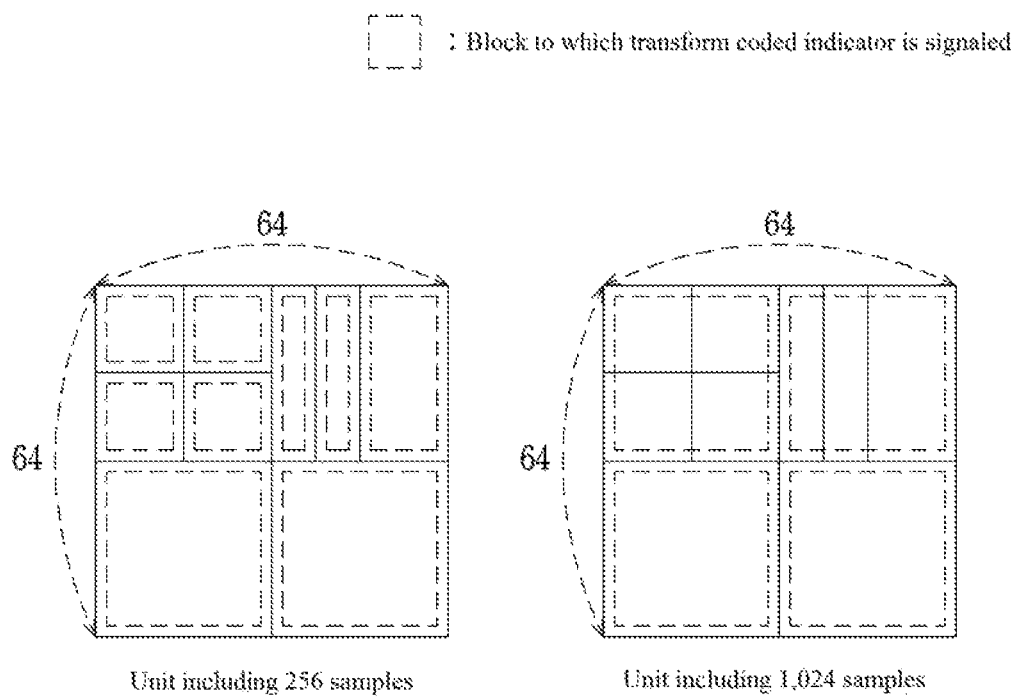
FIG. 10 is a diagram for explaining an aspect in which a transform coefficient coded indicator is decoded based on a predetermined unit.

FIG. 10 is a diagram for explaining an aspect in which a transform coefficient coded indicator is decoded based on a predetermined unit.

When the predetermined unit indicates 256 samples, the transform coefficient coded indicator may be encoded and signaled based on a block including 256 or more samples. Accordingly, in the example shown in FIG. 10, the transform coefficient coded indicator specifying whether there exists a non-zero transform coefficient may be decoded for a block of 16×16 or 8×32.

The transform coefficient coded indicator may also be encoded and signaled for a block including more than 256 samples. Thus, in the example shown in FIG. 10, the transform coefficient coded indicator indicating whether there exists a non-zero transform coefficient may be decoded for a block of 16×32 or 32×32.

When the predetermined unit indicates 1024 samples, the transform coefficient coded indicator may be encoded and signaled based on a block including 1024 or more samples. Accordingly, in the example shown in FIG. 10, a single transform coefficient coded indicator may be decoded for an upper block including four square blocks of 16×16 size. And a single transform coefficient coded indicator may be decoded for an upper block including two 8×32 non-square blocks and 16×32 non-square block.

The transform coefficient coded indicator may be encoded and signaled separately for blocks including more than 1024 samples. Accordingly, in the example shown in FIG. 10, the transform coefficient coded indicator may be decoded for a 32×32 block.

The predetermined unit may indicate a maximum unit in which the transform coefficient coded indicator is encoded and signaled. That is, a maximum size or a shape of the block to which the transform coefficient coded indicator is to be encoded may be defined based on the predetermined unit. In this case, the number of samples indicated by the transform coefficient coded unit indicator and the number of samples included in the transform block may be compared to determine the unit in which the transform coefficient is signaled.

For example, when the number of samples indicated by the transform coefficient coded unit indicator is larger than the number of samples included in the transform block, the transform coefficient coded indicator may be encoded and signaled for the transform block. On the other hand, when the number of samples indicated by the transform coefficient coded unit indicator is smaller than the number of samples included in the transform block, the transform block may be divided into a plurality of regions according to the predetermined unit, and then the transform coefficient coded indicator may be encoded and signaled for each region.

If the non-zero residual coefficient is included in the current block, a scanning order for the current block may be determined S830, and an absolute value or a sign of each transform coefficient may be decoded according to the determined scanning order S840.

Figure 11:
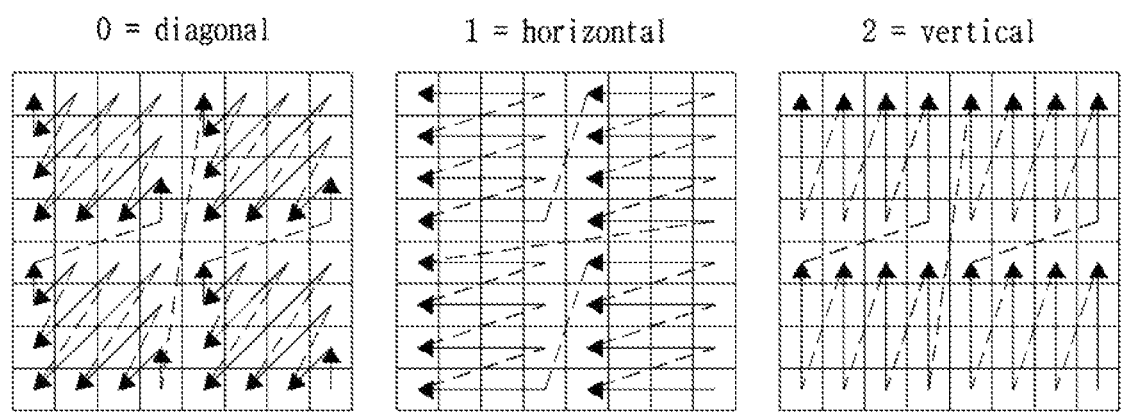
FIG. 11 is a diagram showing a decoding procedure of transform coefficients according to each scanning order.

The decoder may select the scanning order of the current block among a plurality of scanning order candidates. Here, the plurality of scanning order candidates may include at least one of a diagonal scan, a horizontal scan and a vertical scan. For example, FIG. 11 is a diagram showing a decoding procedure of transform coefficients according to each scanning order.

The scanning order of the current block may be determined based on at least one of a size, a shape, an encoding mode, or an intra prediction mode of the current block (for example, a transform block or a coding block). Here, the size of the current block may be represented by at least one of a width, a height, or an area of the block.

For example, the scanning order of the current block may be determined by comparing the size of the current block with a predefined threshold value. Here, the predefined threshold value may be expressed by a maximum value or a minimum value.

For example, a transform block or a coding block of 4×4 or 8×8 encoded in intra mode may use a vertical scan, a horizontal direction or a diagonal scan depending on an intra prediction mode. Specifically, the vertical scan is used when the intra prediction mode is a horizontal direction, the horizontal scan is used when the intra prediction mode is a vertical direction, and the diagonal scan is used when the intra prediction mode is other than the horizontal and the vertical direction. On the other hand, the diagonal scan may be used for a transform block or a coding block encoded in inter mode or for a transform block or a coding block encoded in intra mode but has a size equal to or greater than 16×16.

Alternatively, at least one of the number or types of scanning order candidates available for the current block may be set differently based on at least one of a size, a shape, an encoding mode, or an intra prediction mode of the current block. That is, according to the above-enumerated conditions, it is possible to restrict the current block from using at least one of the diagonal scan, the horizontal scan and the vertical scan.

For example, if the current block has a non-square shape, the scanning order available for the current block may be determined according to a ratio between a width and a height. For example, if the current block is a coding block or a transform block having a shape whose height is longer than a width (e.g., N×2N or N×4N), at least one of the diagonal scan or the horizontal scan may be selected. On the other hand, if the current block is a coding block or a transform block having a shape whose width is longer than a height (e.g., 2N×N or 4N×N), at least one of the diagonal scan and the vertical scan may be selected.

The current block may be divided into predetermined sub-blocks, and the transform coefficient scanning may be performed in a unit of a sub-block. For example, the transform coefficient scanning may be performed on a transform coefficient base block unit including a predetermined number of pixels.

Even if the current block has a non-square shape, the current block can be divided into sub-blocks, and scanning may be performed on a sub-block basis. At this time, the size of the sub-block may have a fixed value and may have a value varying based on at least one of the size or the shape of the current block (e.g., a coding block or a transform block).

For example, as described above with reference to the transform coefficient base block, the sub-block may include a fixed number of pixels (for example, 16). The size of the sub-block may be determined to 4×4, 2×8, 8×2 or the like according to the shape of the coding block or the transform block.

A partition type of the sub-block may be the same as the coding block or the transform block. Alternatively, the partition type of the sub-block may be determined independently of the partition type of the coding block. The sub-block may have a square shape or a non-square shape depending on the partition type.

The scanning order of each sub-block may be determined according to the scanning order of the current block. For example, FIG. 12 illustrates a scanning order between sub-blocks according to a scanning order of a current block.

Figure 12:
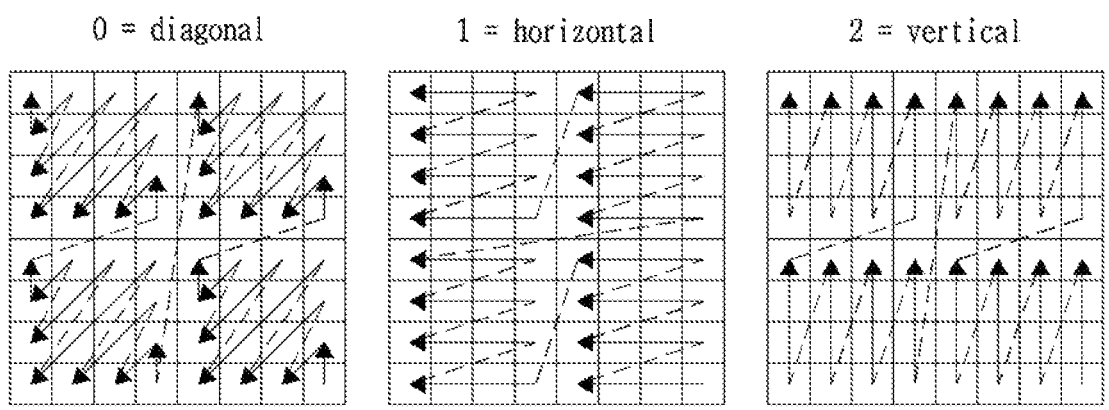
FIG. 12 illustrates a scanning order between sub-blocks according to a scanning order of a current block.

In the example shown in FIG. 12, when the scanning order of the current block is a diagonal scan, at least one of the scanning order between sub-blocks or the scanning order within a sub-block may follow the diagonal scan. On the other hand, if the scanning order of the current block is a horizontal scan, at least one of the scanning order between sub-blocks or the scanning order of transform coefficients in a sub-block may follow the horizontal scan. Alternatively, when the scanning order of the current block is a vertical scan, at least one of the scanning order between the sub-blocks or the scanning order within a sub-block may follow the vertical scan.

Alternatively, the scanning order of each sub-block may be adaptively set according to a shape or a size of the coding block or the current block. That is, the scanning order of the transform coefficient base blocks may be set differently depending on the size or the shape of the current block.

Figure 13:
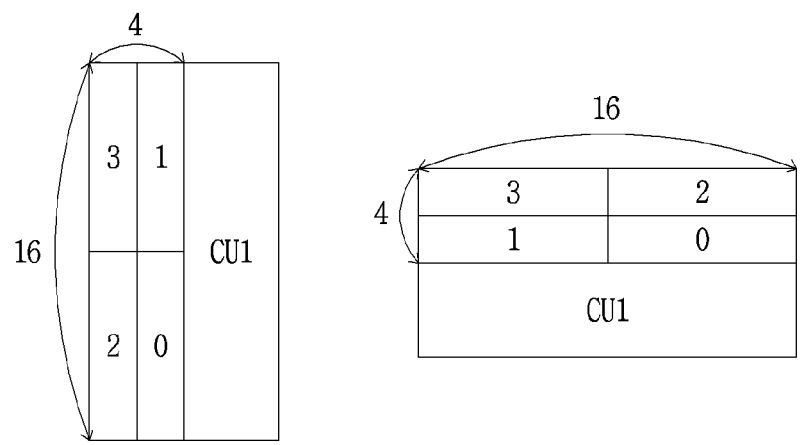
FIG. 13 is a diagram showing a scanning order of a transform coefficient base block according to a shape of a current block.

FIG. 13 is a diagram showing a scanning order of a transform coefficient base block according to a shape of a current block. In FIG. 13, numbers marked in each sub-block indicate order to scan.

If the current block is a coding block or a transform block whose height is longer than a width, a diagonal scan may be used to sequentially scan transform coefficient base blocks as in the example shown in FIG. 13.

On the other hand, if the current block is a coding block or a transform block having a shape whose width is longer than a height, a horizontal scan may be used to sequentially scan transform coefficient base blocks as in the example shown in FIG. 13.

That is, according to the shape of the current block, the scanning order of the transform coefficient base blocks may be set to be different.

The relationship between the shape of the current block and the scanning order of the transform coefficient base blocks, which is defined in FIG. 13, is merely one embodiment of the present invention, and the present invention is not limited thereto. For example, when the current block is a coding block or a transform block whose height is longer than the width defined in FIG. 13, it is also possible to sequentially scan the transform coefficient base blocks using a vertical scan.

According to an embodiment of the present invention, scanning may be performed in a unit of a block group (or in a unit of a block) or a scanning order may be determined in a unit of the block group. Here, the block group may represent a block unit in which scanning is performed, or may represent a group of transform blocks that share the same scanning type. The block group may include at least one transform block. Alternatively, a plurality of non-square transform blocks constituting a square block may be defined as the block group.

For example, when a size or a range of the block group is determined, the block group may be divided into units for scanning to scan the block group. Here, a scanning unit may have the same size or the same shape as a transform block included in the block group. Alternatively, at least one of the size or the shape of the scanning unit may be different from the transform block included in the block group. For example, a scanning unit is limited to a square shape, while the block group may include a non-square transform block.

For example, if the size or the range of the block group is determined, the scanning order for the block group may be determined and the determined scanning order may be applied to all transform blocks in the block group.

The block group may have a square shape or a non-square shape. Also, the block group may include at least one non-square transform block or at least one square transform block.

A size of the block group may have a fixed value or a value determined variably. For example, the size of the block group may be fixed size, such as 64×64, 32×32, or 16×16, or may be determined based on information about the size of the block group transmitted through the bitstream.

If the residual coefficient of the current block is obtained, an inverse quantization may be performed on the residual coefficient of the current block S850.

It is possible to determine whether to skip an inverse transform on the dequantized residual coefficient of the current block S860. Specifically, the decoder may determine whether to skip the inverse transform on at least one of a horizontal direction or a vertical direction of the current block. When it is determined to apply the inverse transform on at least one of the horizontal direction or the vertical direction of the current block, a residual sample of the current block may be obtained by inverse transforming the dequantized residual coefficient of the current block S870. Here, the inverse transform may be performed using at least one of DCT, DST, and KLT.

When the inverse transform is skipped in both the horizontal direction and the vertical direction of the current block, the inverse transform is not performed in the horizontal direction and the vertical direction of the current block. In this case, the residual sample of the current block may be obtained by scaling the dequantized residual coefficient with a predetermined value S880.

Skipping the inverse transform on the horizontal direction means that the inverse transform is not performed on the horizontal direction but the inverse transform is performed on the vertical direction. At this time, scaling may be performed in the horizontal direction.

Skipping the inverse transform on the vertical direction means that the inverse transform is not performed on the vertical direction but the inverse transform is performed on the horizontal direction. At this time, scaling may be performed in the vertical direction.

It may be determined whether or not an inverse transform skip technique may be used for the current block depending on a partition type of the current block. For example, if the current block is generated through a binary tree-based partitioning, the inverse transform skip scheme may be restricted for the current block. Accordingly, when the current block is generated through the binary tree-based partitioning, the residual sample of the current block may be obtained by inverse transforming the current block. In addition, when the current block is generated through binary tree-based partitioning, encoding/decoding of information indicating whether or not the inverse transform is skipped (e.g., transform_skip_flag) may be omitted.

Alternatively, when the current block is generated through binary tree-based partitioning, it is possible to limit the inverse transform skip scheme to at least one of the horizontal direction or the vertical direction. Here, the direction in which the inverse transform skip scheme is limited may be determined based on information decoded from the bitstream, or may be adaptively determined based on at least one of a size of the current block, a shape of the current block, or an intra prediction mode of the current block.

For example, when the current block is a non-square block having a width greater than a height, the inverse transform skip scheme may be allowed only in the vertical direction and restricted in the horizontal direction. That is, when the current block is 2N×N, the inverse transform is performed in the horizontal direction of the current block, and the inverse transform may be selectively performed in the vertical direction.

On the other hand, when the current block is a non-square block having a height greater than a width, the inverse transform skip scheme may be allowed only in the horizontal direction and restricted in the vertical direction. That is, when the current block is N×2N, the inverse transform is performed in the vertical direction of the current block, and the inverse transform may be selectively performed in the horizontal direction.

In contrast to the above example, when the current block is a non-square block having a width greater than a height, the inverse transform skip scheme may be allowed only in the horizontal direction, and when the current block is a non-square block having a height greater than a width, the inverse transform skip scheme may be allowed only in the vertical direction.

Information indicating whether or not to skip the inverse transform with respect to the horizontal direction or information indicating whether to skip the inverse transformation with respect to the vertical direction may be signaled through a bitstream. For example, the information indicating whether or not to skip the inverse transform on the horizontal direction is a 1-bit flag, 'hor_transform_skip_flag', and information indicating whether to skip the inverse transform on the vertical direction is a 1-bit flag, 'ver_transform_skip_flag'. The encoder may encode at least one of 'hor_transform_skip_flag' or 'ver_transform_skip_flag' according to the shape of the current block. Further, the decoder may determine whether or not the inverse transform on the horizontal direction or on the vertical direction is skipped by using at least one of "hor_transform_skip_flag" or "ver_transform_skip_flag".

It may be set to skip the inverse transform for any one direction of the current block depending on a partition type of the current block. For example, if the current block is generated through a binary tree-based partitioning, the inverse transform on the horizontal direction or vertical direction may be skipped. That is, if the current block is generated by binary tree-based partitioning, it may be determined that the inverse transform for the current block is skipped on at least one of a horizontal direction or a vertical direction without encoding/decoding information (e.g., transform_skip_flag, hor_transform_skip_flag, ver_transform_skip_flag) indicating whether or not the inverse transform of the current block is skipped.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed is:

1. A method for decoding a video, the method comprising:
decoding a coded block flag indicating whether a non-zero transform coefficient exists in a current block;
when the coded block flag indicates that at least one non-zero transform coefficient exists in the current block, decoding a transform coefficient of the current block, transform coefficients in the current block being decoded in a unit of a sub-block by applying a pre-determined scanning order; and
determining whether to skip an inverse-transform for the current block or not,
wherein:
whether to decode a transform skip flag, indicating whether to skip the inverse-transform or not, is determined based on a partition type of a coding block, and
wherein when the current block is one of partitions generated by partitioning the coding block either in a horizontal direction or in a vertical direction, decoding of the transform skip flag is omitted, and it is determined not to skip the inverse-transform for the current block.

2. A method for encoding a video, the method comprising:
determining whether to skip a transform for a current block or not;
when at least one non-zero transform coefficient exists in the current block, encoding a transform coefficient of the current block, transform coefficients in the current block being encoded in a unit of a sub-block by applying a pre-determined scanning order; and
encoding a coded block flag indicating whether the non-zero transform coefficient exists in the current block,
wherein:
whether to encode a transform skip flag indicting whether the transform is skipped or not is determined based on a partition type of a coding block, and
wherein when the current block is one of partitions generated by partitioning the coding block either in a horizontal direction or in a vertical direction, the transform is not skipped for the current block, and encoding of the transform skip flag is omitted.

3. A non-transitory computer-readable medium for storing data associated with a video signal, comprising:
a data stream stored in the non-transitory computer-readable medium, the data stream being encoded by an encoding method which comprising:
determining whether to skip a transform for a current block or not;
when at least one non-zero transform coefficient exists in the current block, encoding a transform coefficient of the current block, transform coefficients in the current block being encoded in a unit of a sub-block by applying a pre-determined scanning order; and
encoding a coded block flag indicating whether the non-zero transform coefficient exists in the current block,
wherein:
whether to encode a transform skip flag indicting whether the transform is skipped or not is determined based on a partition type of a coding block, and
wherein when the current block is one of partitions generated by partitioning the coding block either in a horizontal direction or in a vertical direction, the transform is not skipped for the current block, and encoding of the transform skip flag is omitted.

4. The method of claim 1, wherein a shape of the sub-block is adaptively determined based on a shape of the current block when the current block is constituted with a pre-determined number of samples, and
wherein the pre-determined number is one of 16, 32 and 64.

* * * * *